United States Patent
Kim et al.

(10) Patent No.: US 10,049,484 B2
(45) Date of Patent: Aug. 14, 2018

(54) APPARATUS AND METHOD FOR GENERATING 3D CHARACTER MOTION VIA TIMING TRANSFER

(71) Applicant: Electronics and Telecommunications Research Institute, Daejeon-si (KR)

(72) Inventors: Ye Jin Kim, Daejeon-si (KR); Sung Jin Hong, Daejeon-si (KR); Seong Min Baek, Daejeon-si (KR); Myung Gyu Kim, Daejeon-si (KR); Il Kwon Jeong, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 29 days.

(21) Appl. No.: 15/142,501

(22) Filed: Apr. 29, 2016

(65) Prior Publication Data

US 2017/0206695 A1    Jul. 20, 2017

(30) Foreign Application Priority Data

Jan. 18, 2016   (KR) ........................ 10-2016-0006012

(51) Int. Cl.
  *G06T 13/20*   (2011.01)
  *G06T 13/40*   (2011.01)
  *G06T 19/20*   (2011.01)

(52) U.S. Cl.
  CPC .............. *G06T 13/40* (2013.01); *G06T 19/20* (2013.01)

(58) Field of Classification Search
  None
  See application file for complete search history.

(56) References Cited

U.S. PATENT DOCUMENTS

| | | | |
|---|---|---|---|
| 6,462,742 B1 * | 10/2002 | Rose | ....................... G06T 13/40 345/473 |
| 6,552,729 B1 * | 4/2003 | Di Bernardo | ........... G06T 13/20 345/473 |
| 6,924,803 B1 | 8/2005 | Girling et al. | |
| 8,194,082 B2 | 6/2012 | Smith | |

(Continued)

FOREIGN PATENT DOCUMENTS

| | | |
|---|---|---|
| KR | 10-2005-0058877 | 6/2005 |
| KR | 10-0624453 | 9/2006 |

(Continued)

OTHER PUBLICATIONS

S. C. L. Terra et al.; "Performance Timing for Keyframe Animation", Eurographics/ACM SIGGRAPH Symposium on Computer Animation, 2004; pp. 253-258.

(Continued)

*Primary Examiner* — Ryan M Gray
(74) *Attorney, Agent, or Firm* — Kile Park Reed & Houtteman PLLC

(57) ABSTRACT

An apparatus for generating a 3-dimensional character motion via timing transfer. The apparatus includes an example motion database configured to store data about one or more example motions of characters with an identical skeleton model structure; an example motion analyzer configured to generate a timing source by analyzing timing in a designated example motion data among the one or more example motion data stored in the example motion database; and an input motion transfer part configured to re-adjust spatial movements in an input motion in correspondence with the generated timing source so as to generate an output motion.

14 Claims, 12 Drawing Sheets

(56) References Cited

U.S. PATENT DOCUMENTS

| | | |
|---|---|---|
| 8,797,328 B2 | 8/2014 | Corazza et al. |
| 9,001,132 B1 | 4/2015 | Wooley et al. |
| 2010/0238182 A1* | 9/2010 | Geisner .................. G06T 13/00 345/474 |
| 2010/0259547 A1* | 10/2010 | de Aguiar ............... G06T 13/40 345/474 |
| 2012/0075349 A1* | 3/2012 | Lee ......................... G06T 13/40 345/672 |
| 2013/0230211 A1* | 9/2013 | Tanabiki .................. G06T 7/75 382/103 |
| 2015/0193945 A1* | 7/2015 | Baek ....................... G06T 13/80 345/474 |
| 2017/0192496 A1* | 7/2017 | Balslev ................... G06F 3/011 |

FOREIGN PATENT DOCUMENTS

| | | |
|---|---|---|
| KR | 10-1006191 | 1/2011 |
| KR | 10-1102778 | 1/2012 |
| KR | 10-2012-0071256 | 7/2012 |

OTHER PUBLICATIONS

Eugene Hsu et al.; "Guided Time Warping for Motion Editing", Eurographics/ACM SIGGRAPH Symposium on Computer Animation, 2007; pp. 45-52.

Patrick Coleman et al.; "Staggered Poses: A Character Motion Representation for Detail—Preserving Editing of Pose and Coordinated Timing", Eurographics/ACM SIGGRAPH Symposium on Computer Animation, 2008; pp. 137-146.

Noah Lockwood et al.; "Biomechanically-Inspired Motion Path Editing", Eurographics/ACM SIGGRAPH Symposium on Computer Animation, 2011; pp. 267-276.

Yejin Kim et al.; "Temporal Transfer of Locomotion Style", ETRI Journal, vol. 37, No. 2, Apr. 2015, pp. 406-416.

* cited by examiner

APPARATUS AND METHOD FOR GENERATING 3D CHARACTER MOTION VIA TIMING TRANSFER

CROSS-REFERENCE TO RELATED APPLICATION(S)

This application claims priority from Korean Patent Application No. 10-2016-0006012, filed on Jan. 18, 2016, in the Korean Intellectual Property Office, the disclosure of which is incorporated herein by reference in its entirety.

BACKGROUND

1. Field

The following description relates to creation and editing of content, and more particularly, a technology for creating and editing a 3-dimensional virtual character animation.

2. Description of Related Art 3-dimensional virtual characters have been widely used in a range of digital content, such as movies, games, broadcasting, and avatars. And it is generally understood that in order to create animation wherein a virtual characters exhibit realistic movements, both, quantitative and qualitative aspects need to be considered.

The quantitative aspects of the character animation, such as location, velocity, and acceleration of motion, can be numerically calculated, while in many cases, the qualitative aspects are difficult or impossible to numerically analyze. Especially, when a new motion generated by editing the qualitative aspects of a particular motion, timing that indicates the start and end of said motion plays a key role in expressing the motion style and characteristics. For example, if a motion of a character moving from one location to another has faster timing, it may appear to be energetic and dynamic, whereas even the same motion that has slower timing may appear to be tired and depressed. Also, if a character is stationary at the same position for a long period of time, the character's motion appears to have discontinuities between movements. On the contrary, a short motion sequence in which the character is stationary makes the overall movements in the motion look organic and smooth. Therefore, in the process of editing a motion style by using an articulated skeleton model, which consists of multiple joints and is widely used in generating character animation, the user needs to adjust as many joint rotation timings as the number of joints.

A popular method being used for generating character motions is key-frame animation, which has been widely used. In this method, the user is allowed to freely generate a motion of a desired style, but editing a number of motion timings that correspond to key frames is a laborious and time-consuming task for the following reasons:

First, the multi joint skeleton model has high of degrees of freedom (DOF) and the user is required to have specialized training and physical knowledge about human movements (e.g., constraints imposed on a range of human movements due to the gravity and shift correlations between joints) in order to generate a motion that is of a high quality by adjusting the timings associated with a number of joints. It is especially difficult for a user to express a realistic shift of weight and kinetic energy, which is closely connected to character motion timings, if said user is one who lacks experience and expertise in editing the temporal aspects of motion.

Also, 24 to 30 or more frames of postures in a motion need to be generated per second in order for the character animation to look natural. To this end, editing timings of all joints that relate to key postures is required, and this task is time consuming even to experienced animators.

Finally, most commercial 3D modeling tools for editing motion timing use a complicated editing process and user interface, and hence it is, indeed, difficult for a novice user to generate realistic and natural animation using such tools. For the above reasons, the key-frame animation technique requires a large number of skilled animators to make even a short character animation if it is of a high quality, resulting in an increase of production cost.

Meanwhile, another method for generating character motions is motion-capturing, whereby movements of a performer are recognized and tracked, in real time, via a number of cameras, and then the movements are reconstructed as motions of a virtual character model. In this method, the movements of the performer are directly recorded, so that it is possible to generate motion data that is of a very high quality. Especially, the captured 3D motion data is fitted onto a multi-joint skeleton, and thus can be easily applied to the existing character animation production pipeline. However, 24 to 30 or more frames per second for a motion are captured according to the speed of a camera, and thus the generated motion data has high level of continuity and density between frames. As a result, when editing timing information in the captured data, the user may unexpectedly destroy physical validity of movements in the consecutive frames. Accordingly, when the user transforms the captured data into a desired motion style, the results may exhibit a lesser quality due to unnatural movements and noise. Also, a high-quality motion capture system for recognizing and tracking motion data is a very costly equipment, which requires an enough physical space for motion capturing and a number of operators with specialized training. In particular, the proficiency of the performer for the motion capturing is the factor that is most influential to motion quality; for example, it is quite difficult to extract high quality of timing information of complex, dynamic motions, such as dance and athletics, from movements of an ordinary person, which is the reason a professional performer would be needed. For the aforesaid reasons, generation of motion data via motion capturing requires quite a long preparation time and high cost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an apparatus and method for generating a 3-dimensional (3D) character motion via timing transfer in order to generate motion data necessary for generating 3D character animation at low cost.

The following description also relates to an apparatus and method for generating a 3D character motion via timing transfer which is a motion style editing tool that can transform existing motion data that was generated by skilled animators, such that a user can reuse said motion data at his/her own discretion.

In one general aspect, there is provided an apparatus for generating 3-dimensional (3D) character motion via timing transfer, the apparatus including: an example motion database configured to store data about one or more example motions of characters with an identical skeleton model structure; an example motion analyzer configured to generate a timing source by analyzing timing in a designated example motion data among the one or more example motion data stored in the example motion database; and an input motion transfer part configured to re-adjust spatial movements in an input motion in correspondence with the generated timing source so as to generate an output motion.

In another general aspect, there is provided a method for generating a 3D character motion via timing transfer, the method including: generating a timing source by analyzing timing in one or more example motions of characters with an identical skeleton model structure; and transforming an input motion by re-adjusting spatial movements in the input motion in correspondence with the generated timing source.

Other features and aspects will be apparent from the following detailed description, the drawings, and the claims.

Figure 1:
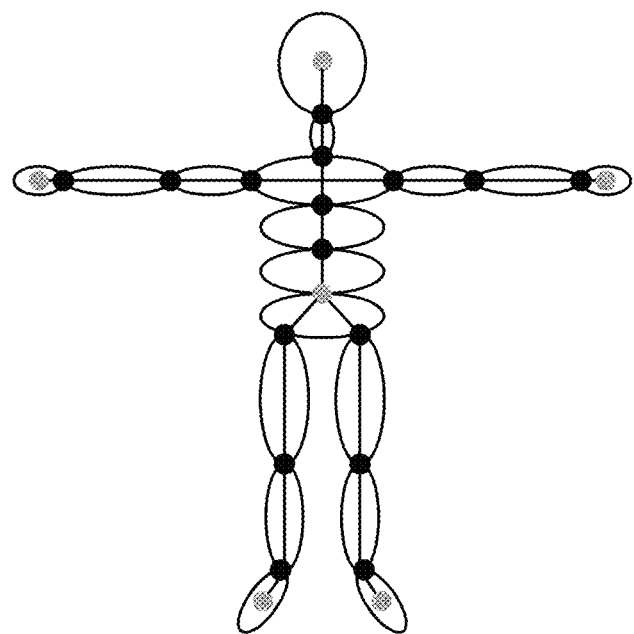
FIG. 1 is a diagram illustrating an example of a multi-joint skeleton model of a 3-dimensional (3D) virtual character.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a multi-joint skeleton model of a 3-dimensional (3D) virtual character.

Referring to FIG. 1, the skeleton model used for 3-dimensional character animation has a structure starting from a root joint that is connected to joints at the head, both hands, and feet via internal joints. Each joint may have six rotations and six degrees of freedom (DOF) about x-, y-, and z-axes. Thus, in order to generate a motion of a new style by creating and editing a character, a user needs to repeatedly adjust the DOF for a number of joints that are related to the motion style. Various methods have been suggested to automatically generate a motion by utilizing existing motion data in manual adjustments of the DOF for joints. However, such methods only focus on the generation of motions of the same style for characters with different body proportions. Especially, these methods directly edit spatial data in the original motion during the motion editing process, and hence it is not possible to ensure the quality of output motion.

Therefore, the present disclosure suggests an apparatus and method for efficiently generating a motion of a new style while preserving the quality of the original motion by applying a style of existing example motion that was generated by the skilled animators to an input motion (timing information) without changing spatial details.

Figure 2:
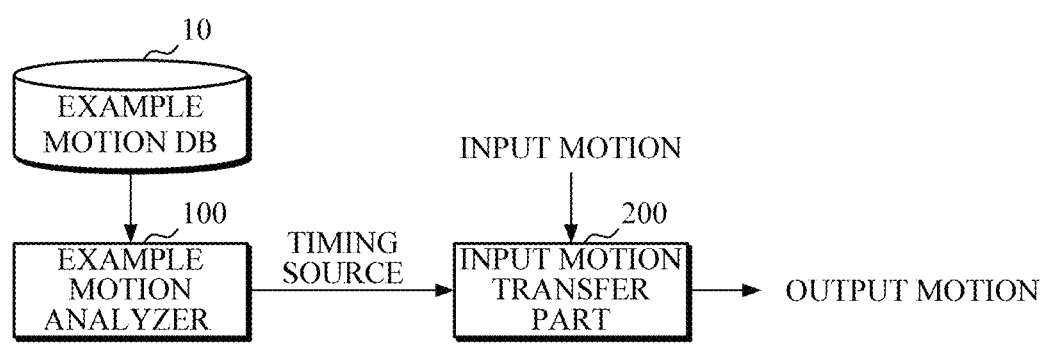
FIG. 2 is a diagram illustrating an apparatus for generating a 3D character motion via timing transfer according to an exemplary embodiment.

FIG. 2 is a diagram illustrating an apparatus for generating a 3D character motion via timing transfer according to an exemplary embodiment.

Referring to FIG. 2, an apparatus for generating a 3D character motion via timing transfer includes an example motion database (DB) 10, an example motion analyzer 100, and an input motion transfer part 200.

The example motion DB 10 may store all of the data generated using a key-frame or motion capture technique, but here, for purpose of simplifying a motion style transfer, it is assumed that all data use the same skeleton model structure as shown in FIG. 1. If, however, the example motions stored in the example motion DB 10 had used different skeleton models from each other, the different skeleton models may be mapped to a single skeleton model using a motion retargeting technique, and the resulting single skeleton model may be used. In a case where data generated using a motion capture technique is used, said data may store various postures: postures indicating the start and end of movement according to the performance of an object; erroneous postures; duplicated postures; and the like. The example motion DB 10 may store data that was preprocessed to only contain key postures that are necessary to represent a style of a motion.

The example motion analyzer 100 analyzes timing of all example motion data stored in the example motion DB 10 and generates a timing source. It is necessary to transfer temporal changes of motions to the same time axis and control the timing of each joint on the same axis. The timings can be represented as key times that indicate important moments of a motion. It is, however, time-consuming to manually tag every key time of each example motion stored in the example motion DB 10. Hence, the example motion analyzer 100 automatically detects key times of each example motion stored in the example motion DB 10, and generates a timing source that is data form that can be used for motion style transfer process. The example motion analyzer 100 will be described later in detail with reference to FIG. 3.

The input motion transfer part 200 generates a motion of a new style by modifying a spatial movement of an input motion to match to the timing source of an example motion selected by a user. The input motion transfer part 100 will be described later in detail with reference to FIG. 6.

Figure 3:
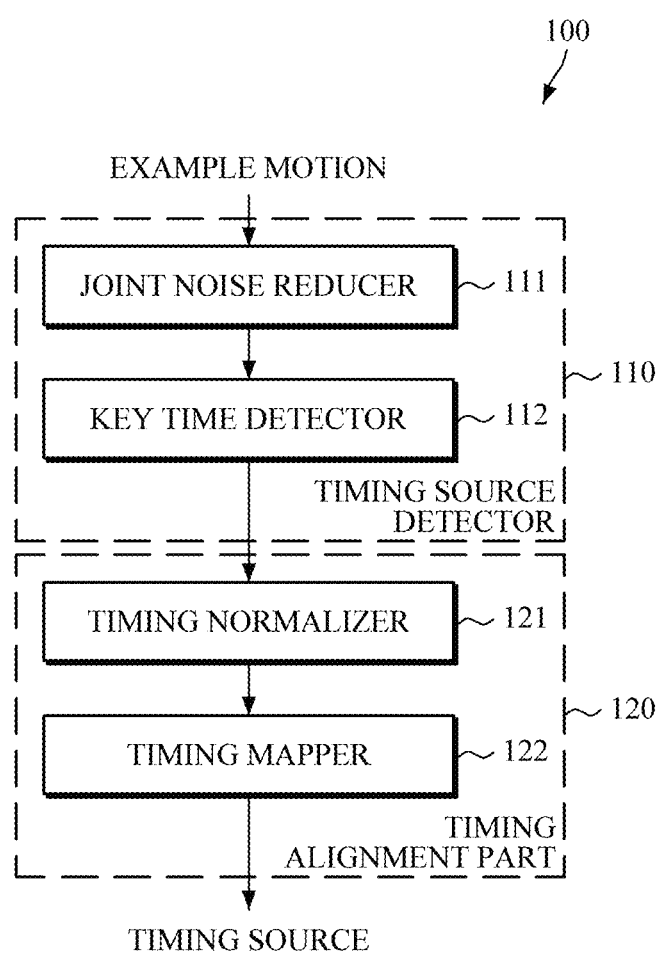
FIG. 3 is a diagram illustrating in detail of an example motion analyzer of FIG. 2.

FIG. 3 is a diagram illustrating in detail of the example motion analyzer of FIG. 2.

Referring to FIG. 3, the example motion analyzer 100 includes a timing source detector 110 and a timing alignment part 120. The timing source detector 110 detects key timing of each example motion as a key time and the timing alignment part 120 sets correspondence in timing between example motions using the detected key times.

The timing source detector 110 includes a joint noise reducer 111 and a key time detector 112.

The joint noise reducer 111 filters out positional noise of each joint in an attempt to accurately calculate acceleration information of the joint. In order to effectively detect key times of a character's motion, five joints, i.e., the character's hands, feet, and head—their positions and acceleration information—are used, whereby said joints are illustrated as lighter-colored markers, as in FIG. 1. For example, motion-captured data may include noise that occurred due to movement, such as the shaking of joints; said noise, which is caused due to marker errors as well as discrepancies between actual proportions and joint positions and those of the skeleton models used when motion fitting. To reduce such noise, the joint noise reducer 111 smooths out local peaks of noise from motion curves of joints by using a low-pass filter, such as a Savitzk-Golay filter. Therefore, a smoothing polynomial of degree 4 may be used at this time, along with a filtering window size consisting of 5 to 10 frames in order to effectively reduce the local peaks while preserving the global shape of the curve.

The key time detector 112 detects key times of the five joints that correspond to both hands, both feet, and the head of the skeleton model.

The key time detector 112 first detects key times based on the contact between the foot of the skeleton model and the ground of a virtual space in each frame of the example motion. The important moments for expressing the style of the example motion include the timing at which the character's foot contacts the ground. To accurately detect the key times, information about a position and acceleration of the joint at the leading part (e.g., forefoot or hindfoot) of the foot is used. Every position of the joint at the leading part of the foot in all frames included in the example motion is calculated, and then, specific frames are detected when they contain postures in which the height of the joint at the leading part of the foot from the ground is less than 10% of the total length of the foot, with reference to an up-axis of the virtual space. From among the detected frames, those in which the movement of the joint at the leading part of the foot has an acceleration that is near zero are selected. Then, the timing (based on the start time of the example motion) of the frame at which the position of the joint at the leading part of the foot is the closest to the average position of the foot is designated as the key time of the foot.

The key time detector 112 detects a key time of each frame of the example motion according to acceleration values of both hands and the head of the character skeleton model. The crossing zero rate of a joint at a respective leading part of both hands and head is calculated and the timing of a frame in which the acceleration of a relevant joint is near zero designated as a key time for each of the hands and head. At this time, if the frames designated as the key times are too close to each other (with a spacing of 0.1 to 0.5 seconds), the timing of the intermediate frame is designated as the key time and the duplicate timings are removed.

The timing alignment part 120 transfers the detected key times of the example motions to the same time axis. To this end, the timing alignment part 120 includes a timing normalizer 121 and a timing mapper 122.

The timing normalizer 121 may transform actual times T contained in each example motion into generic times t using dynamic time-warping (DTW). Key times $\{K_1, K_2, \ldots, K_i, \ldots, K_N\}$ of each example model are transformed into generic times $t \in [0, 1]$ as shown in Equation 1 below.

$$t(T) = \left((i-1) + \frac{T - K_i}{K_{i+1} - K_i}\right)\frac{1}{N-1} \quad (1)$$

In Equation 1, $T \in [K_i, K_{i+1}]$, $1 \leq i \leq N$. Similarly, frame F that corresponds to the given t may be calculated by Equation 2 below.

$$F(t) = F_i + \left(\frac{F_{i+1} - F_i}{K_{i+1} - K_i}\right)(t - T_i) \quad (2)$$

In Equation 2, $F_i$ is a key frame that corresponds to $K_i$.

Figure 4:
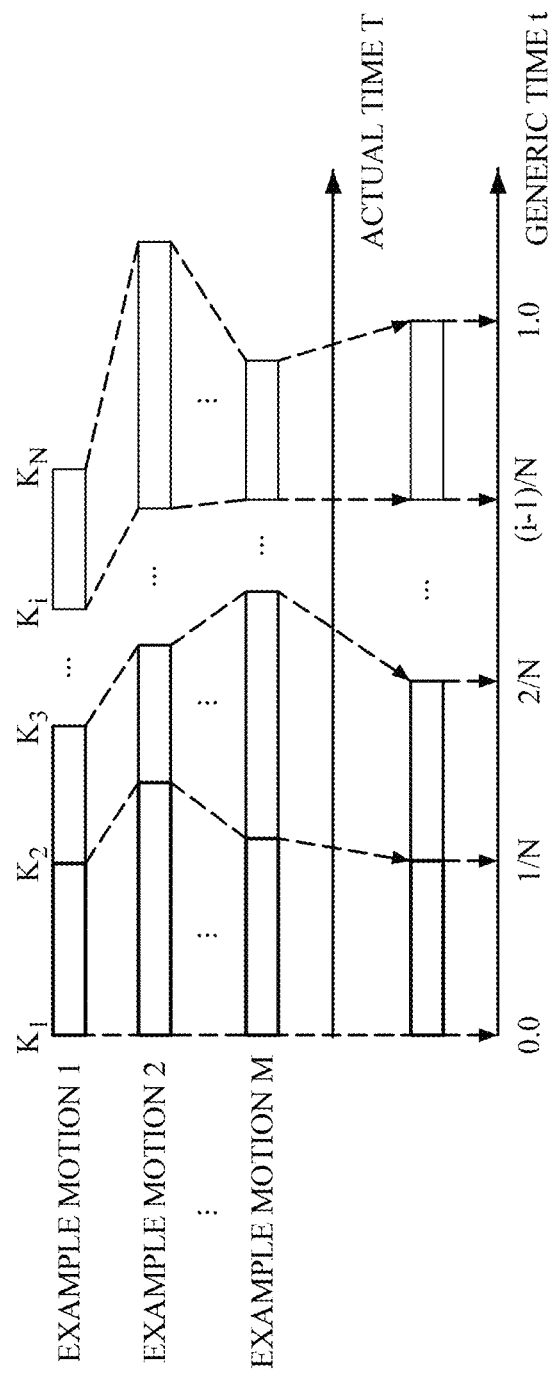
FIG. 4 is a diagram illustrating an example of normalized key times of the example motions.

FIG. 4 is a diagram illustrating an example of normalized key times of the example motions.

Referring to FIG. 4, key times $\{K_1, K_2, \ldots, K_i, \ldots, K_N\}$ extracted from each example motion are normalized from actual time T into generic time t.

Referring back to FIG. 3, the timing mapper 122 sets correspondence in timing between example motions based on the normalized key times. For smooth motion style transfer of an input motion, postures in the frames that correspond to their respective normalized key times are compared so as to determine timings that match in two motions; said normalized key times are those which have been decided upon from among multiple example motions. That is, as shown in FIG. 4, assuming that there are M number of example motions, a posture similarity in frame $K_i$ between every two example motions is calculated and frames $K_i$ may be arranged according to the order of higher to lower posture similarity. For accelerating the computation of the posture similarities, feature vector $V_i$ as shown in FIG. 5 is used.

Figure 5:
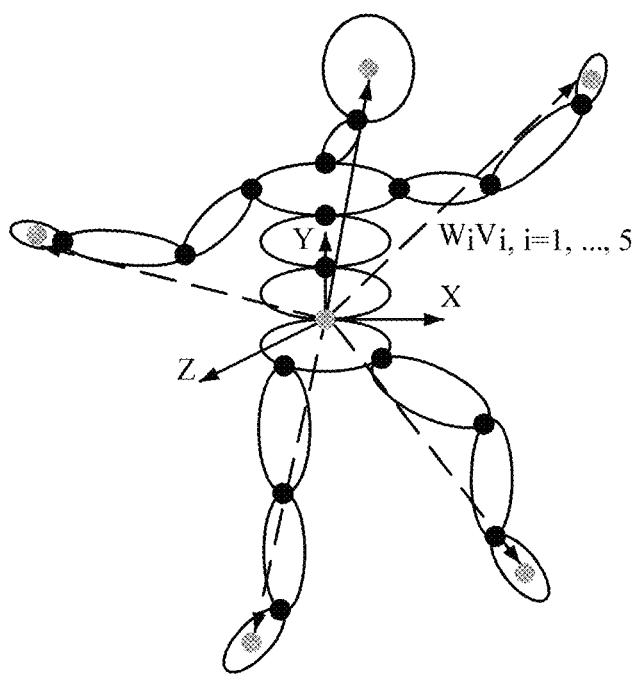
FIG. 5 is a diagram illustrating a structure of a skeleton model used for defining a feature vector for posture comparison.

FIG. 5 is a diagram illustrating a structure of a skeleton model used for defining a feature vector for posture comparison.

Referring to FIG. 5, $V_i$ represents positions and orientations of ends of both hands, ends of both feet and the head joint using a local coordinate system with a root joint as an origin, and an applied weight value $W_i$ may vary according to the importance of the joint. Hence, once the correspondence in timing between the example motions is set, the aligned key times of each example motion can be used as a timing source for timing transfer of an input motion.

Figure 6:
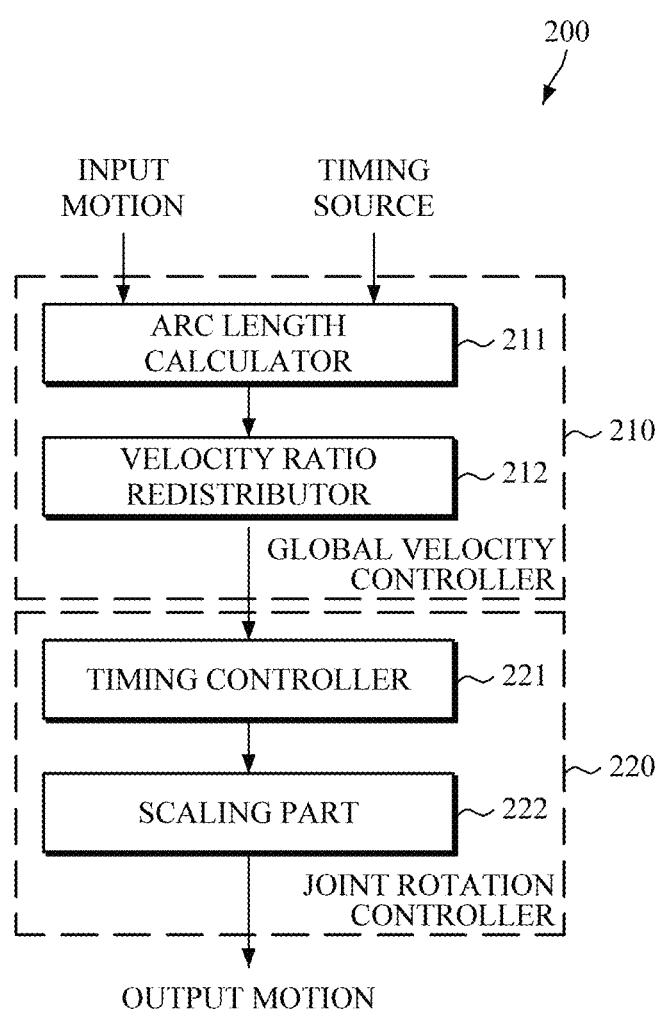
FIG. 6 is a diagram illustrating in detail an input motion transfer part of FIG. 2.

FIG. 6 is a diagram illustrating in detail the input motion transfer part of FIG. 2.

Referring to FIG. 6, the input motion transfer part 200 includes a global velocity controller 210 and a joint rotation controller 220. The global velocity controller 210 controls the global velocity of a motion, which is an important factor for motion style transfer, while the joint rotation controller 220 transfers succession of the skeleton's movements in each motion phase. By doing so, it is possible to efficiently generate a motion of a new style while preserving a quality of the original motion.

The global velocity controller 210 includes an arc length calculator 211 and a velocity ratio redistributor 212.

The arc length calculator 211 re-defines spatial movements of a motion as parameters of a motion path curve, and calculates an instantaneous velocity of the motion according to time from a function of the motion path curve.

The shape of a motion path which indicates the spatial movements of an input motion may be represented as a distance-time function. Given the motion path curve of the input motion is defined as an arc length, and it is specified as a function of time to parameterize the curve within a range of a parameter value, t, where t∈ [0, 1], it is possible to estimate, by using t, a distance that corresponds to the time spent along the motion path of each of the input motion and the timing source (i.e., example motion selected by the user). Thus, it is possible to set time-distance correspondence between two different motions that have the same velocity but different timings.

In order to smoothly transfer the change of a global velocity of the input motion into the global velocity of the timing source, the velocity ratio redistributor 212 matches the input motion and the example motion at the ratio of velocities that is based on generic times t of the two motions. For example, if a new motion is generated by applying generic time t from a motion with a higher body speed intact to generic time t of a motion with a lower speed, the duration between two consecutive key frames (frames associated with key times) of the new motion becomes longer, and thus the user may perceive it as a discontinuity in the motion. In contrary, if generic time t from a motion with a higher body speed is applied to another motion with a lower speed, the duration between two consecutive key frames becomes so short, which may result in unnaturally fast velocity of an output motion. Therefore, in the process of motion style transfer between two motions, it is necessary to smoothly control the overall velocity of an output motion by dividing each motion into phases based on key frames, and matching the ratio of velocities for each phase in the output motion to be the same as the ratio of velocities for each phase in the timing source, rather than adjusting the global velocity of the two motions by using value t. It is assumed that $e_i$ is the number of in-between frames that are present between two key frames of the input motion, and $o_i$, is the distance traveled along the arc length of the ith phase of the input motion, where i ∈ [1, . . . , $N_p$] and $N_p$ is the total number of phases. Similarly, the number of in-between frames and the distance traveled along the arc length of the jth phase in the timing source that corresponds to the ith phase are defined as $ë_j$ and $ö_j$, respectively. Because the velocity ratio of the input motion, $e_i/o_i$, needs to be the same as a new ratio, $è_i$, (the same as that used for the timing source), the total time spent by the timing source is redistributed to each phase duration in the input motion based on the new ratio $è_i$, as follows:

$$è_i = \frac{e_i}{\sum_{1}^{N_I} e_i} N_T, \quad è_i = o_i \frac{ë_j}{ö_j} N_T \tag{3}$$

Here, $N_I$ and $N_T$ are the number of total in-between frames in the input and timing source, respectively. Especially, èi is the number of frames required to move at the average velocity of the timing source over the distance travelled along the arc length of the ith phase in the input motion, while $ê_i$ ensures that the output duration is the same as the timing source. Therefore, if $ê_i$ for the ith phase in the output motion is given as above, from the number of in-between frames in the output motion, an arc length $â_o$ that corresponds to $û_k$ can be approximated by calculating the distance between two neighboring points in the input motion as shown in Equation 4 below.

$$â_o = a_k + \frac{û_k - u_k}{u_{k+1} - u_k}(a_{k+1} - a_k), \tag{4}$$

where, $û_k$ and $u_k$ are normalized by $ê_i$ and $e_i$, respectively, such that $û_k, u_k \in [0, 1]$ for each phase. In addition, $a_k$ is an arc length traveled by $u_k$ in the corresponding phase of the input motion. The actual location in the output motion for a root joint of the skeleton is estimated by interpolating the two nearby frames in the input motion, located at $a_k$ and $a_{k+1}$.

The joint rotation controller 220 includes a timing controller 221 and a scaling part 222.

The timing controller 221 applies the joint rotation timing in the timing source to the joints in the input motion. In order to smoothly transfer the motion style in the timing source to the input motion, it is important not only to match the global velocity between two motions, but also to transfer the succession of joints in the upper body part, starting from the root joint to the joints of the head and leading parts of both hands, in correspondence with the motion style. Here, because movements by the joints in the lower body part below the root of the skeleton contain key physical information (a location of a foot from the ground) and features, the timing transfer is not applied to the lower-body joints. Given that a joint rotation shift is β and an amplitude scale is α, in the skeleton model consisting of multiple joints as shown in FIG. 1, the peak rotations of child and parent joints in the input motion are aligned to ones in the timing source, and then the rotation location and the scale may be adjusted according to the range of movement in the upper body. A shifting amount $β_O$ of the joint rotation that defines the timing of the output motion is as shown in Equation 5 below.

$$Δβ_O = N_I \frac{Δβ_T}{N_T}, \tag{5}$$

where $Δβ_o$ and $Δβ_T$ are timing differences between child and parent joints for the input motion and timing source, respectively, and $N_I$ and $N_T$ are the total number of in-between frames, between key frames, in the input motion and timing source, respectively. The direction of the joint rotation shift that specifies the timing order is determined by the sign (− or +) of $Δβ_T$. For example, if the sign is a negative sign (−), a rotation of a child joint happens earlier than that of its parent, and if the sign is a positive sign (+), the rotation of the child joint occurs after the rotation of its parent joint.

The scaling part 222 scales joint rotations in accordance with the transferred timings for the joints so as to generate a final output motion. Generally, movements in the motion of the multi joint character are affected by timing, and thus the rotations in the output motion need to be scaled based on the ratio of the joint rotation values in the timing source. A joint rotation scaling amount δ for the output motion is determined by Equation 6 below.

$$δ = \left(\frac{α_{IP}}{α_{IC}}\right)\left(\frac{α_{TC}}{α_{TP}}\right), \tag{6}$$

where $\alpha_{IC}$ and $\alpha_{IP}$ are the peak-to-peak amplitudes for the child and its parent joints in the input motion, respectively. Similarly, $\alpha_{TC}$ and $a_{TP}$ are the peak-to-peak amplitudes for the child and its parent joints in the timing source. δ is set to 1 if the amplitude for the child or its parent joint is constant. The range of the movements in the upper body is scaled by multiplying δ with the joint rotation values of all upper-body joints in the input motion.

Figure 7:
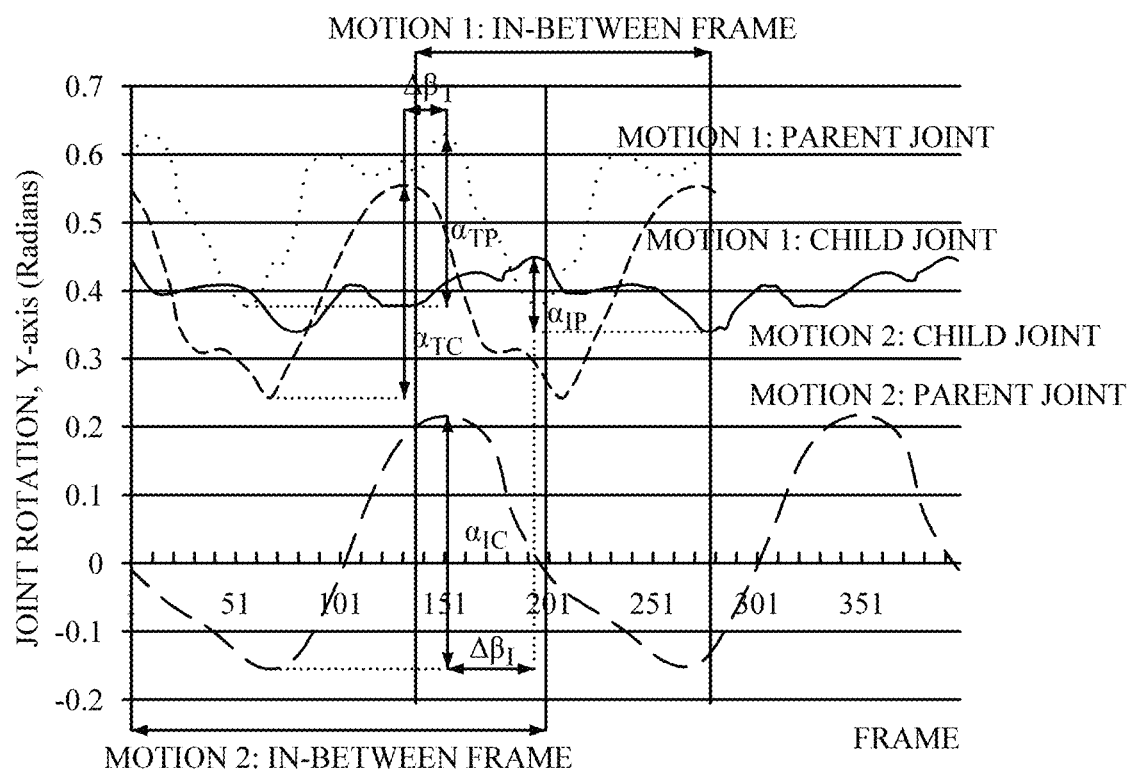
FIG. 7 is a diagram illustrating an example of rotation timing shift and amplitude scale of child and its parent joints in two motions.

FIG. 7 is a diagram illustrating an example of rotation timing shift and amplitude scale of child and its parent joints in two motions.

Figure 8A:
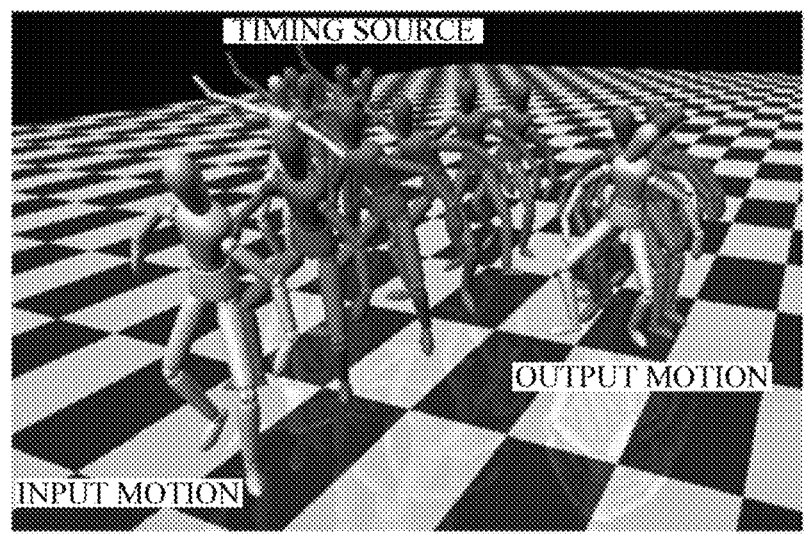
FIGS. 8A and 8B are illustrations showing examples of an output resulting from style transfer from a timing source to an input motion.
Figure 8B:
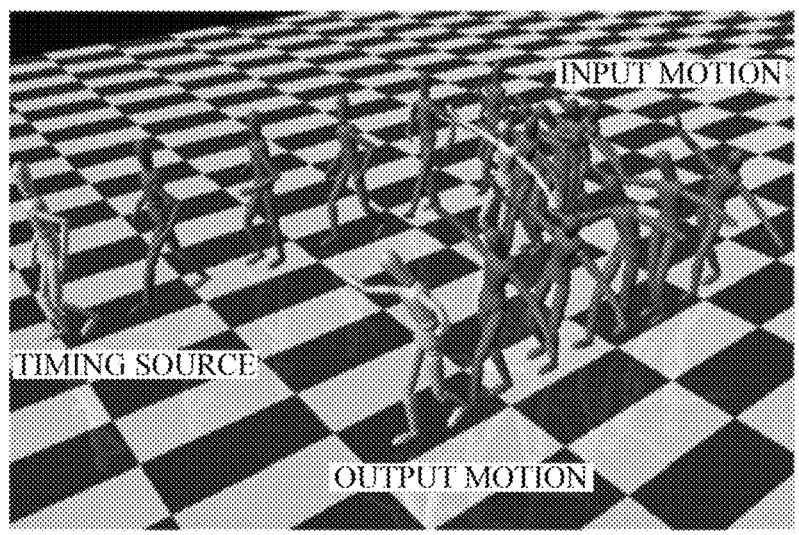

FIGS. 8A and 8B are illustrations showing examples of an output resulting from style transfer from a timing source to an input motion.

FIGS. 8A and 8B show examples of outputs generated by using the method suggested by the present disclosure, whereby a general user who has little experience in editing character motion transfers the timing source of an example motion, which is selected from the example motion DB 10, to the input motion to generate the output motion of a new style.

Figure 9:
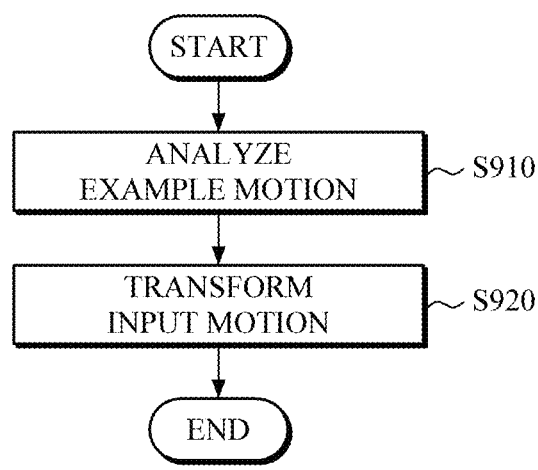
FIG. 9 is a flowchart illustrating a method for generating a 3D character motion via timing transfer according to an exemplary embodiment.

FIG. 9 is a flowchart illustrating a method for generating a 3-dimensional character motion via timing transfer according to an exemplary embodiment.

Referring to FIG. 9, an apparatus analyzes timing in example motion data to generate a timing source, as depicted in S910. Then, the apparatus re-adjusts the spatial movement of the input motion in correspondence with the timing source in the example motion selected by the user so as to generate a motion of a new style, as depicted in S920.

Figure 10:
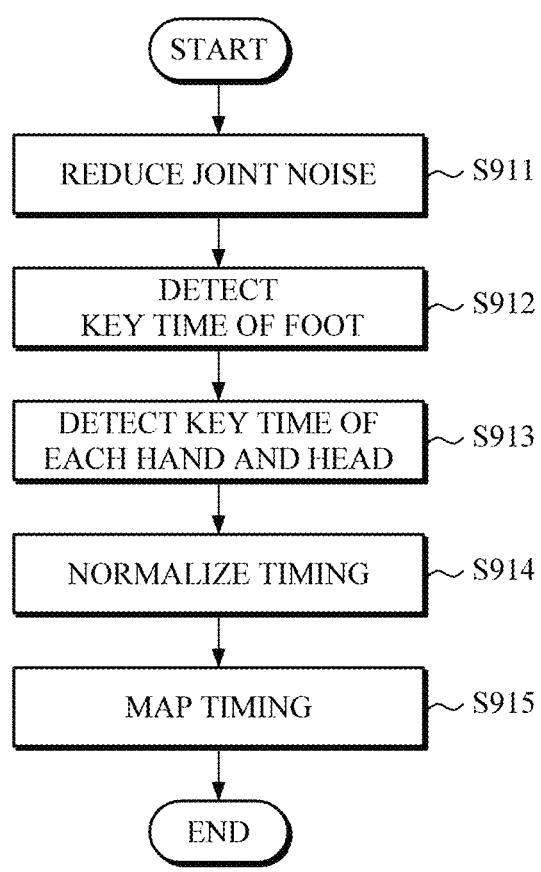
FIG. 10 is a flowchart illustrating in detail the analysis of example motion of FIG. 9.

FIG. 10 is a flowchart illustrating in detail the analysis of example motion of FIG. 9. In the following description, operations that relate to the example motion analyzer illustrated in FIG. 3 will be omitted. However, it will be noted that the operations of the example motion analyzer are included in the example motion analysis process.

Referring to FIG. 10, the apparatus filters out positional noise of each joint in an attempt to accurately calculate acceleration information of the joint. In order to effectively detect key times of a character's motion, five joints, i.e., the character's hands, feet, and head—their positions and acceleration information—are used, whereby said joints are illustrated as lighter-colored markers, as in FIG. 1. For example, motion-captured data may include noise that occurred due to movement, such as the shaking of joints; said noise, which is caused due to marker errors as well as discrepancies between actual proportions and joint positions and those of the skeleton models used when motion fitting. To reduce such noise, the joint noise reducer 111 smooths out local peaks of noise from motion curves of joints by using a low-pass filter, such as a Savitzk-Golay filter. Therefore, a smoothing polynomial of degree 4 may be used at this time, along with a filtering window size consisting of 5 to 10 frames in order to effectively reduce the local peaks while preserving the global shape of the curve.

The apparatus detects key times based on the contact between the foot of the skeleton model and the ground of a virtual space in each frame of the example motion, as depicted in S912. The important moments for expressing the style of the example motion include the timing at which the character's foot contacts the ground. To accurately detect the key times, information about a position and acceleration of the joint at the leading part (e.g., heel or toe) of the foot is used. Every position of the joint at the leading part of the foot in all frames included in the example motion is calculated, and then, specific frames are detected when they contain postures in which the height of the joint at the leading part of the foot from the ground is less than 10% of the total length of the foot, with reference to an up-axis of the virtual space. From among the detected frames, those in which the movement of the joint at the leading part of the foot has an acceleration that is near zero are selected. Then, the timing (based on the start time of the example motion) of the frame at which the position of the joint at the leading part of the foot is the closest to the average position of the foot is designated as the key time of the foot.

The apparatus detects a key time of each frame of the example motion according to acceleration values of both hands and the head of the character skeleton model. The crossing zero rate of a joint at a respective leading part of both hands and head is calculated and the timing of a frame in which the acceleration of a relevant joint is near zero is designated as a key time for each of the hands and head. At this time, if the frames designated as the key times are too close to each other (with a spacing of 0.1 to 0.5 seconds), the timing of the intermediate frame is designated as the key time and the duplicate timings are removed.

The apparatus normalizes actual times T contained in each example motion into generic times t using DTW, as depicted in S914.

The apparatus sets correspondence in timing between the example motions based on normalized key times, as depicted in S915. For smooth motion style transfer of an input motion, postures in the frames that correspond to their respective normalized key times are are those which have been decided upon from among multiple example motions. That is, as shown in FIG. 4, assuming that there are M number of example motions, a posture similarity in frame $K_i$ between every two example motions is calculated and frames $K_i$, may be arranged according to the order of higher to lower posture similarity.

Figure 11:
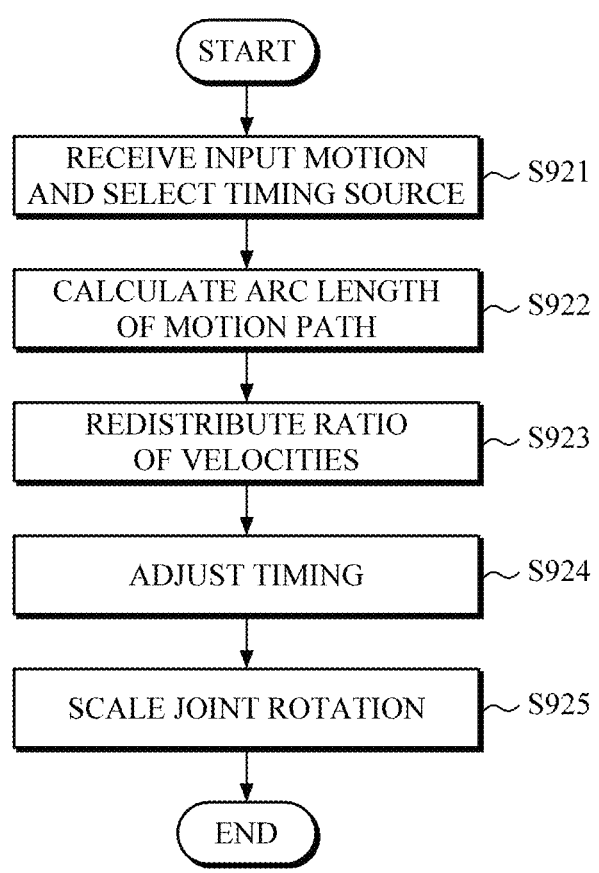
FIG. 11 is a diagram illustrating in detail the operations of the input motion transfer part of FIG. 6.

FIG. 11 is a diagram illustrating in detail the operations of the input motion transfer part of FIG. 6. In the following description, operations that relate to the input motion transfer part of FIG. 6 will be omitted. However, it will be noted that all operations of the input motion transfer part are included in the input motion transfer process.

Referring to FIG. 11, the apparatus receives an input motion, and obtains a timing source in an example motion selected by a user, as depicted in S921.

Then, the apparatus re-defines spatial movements of a motion as parameters of a motion path curve, and calculates an instantaneous velocity of the motion according to time from a function of the motion path curve, as depicted in S922. The shape of a motion path which indicates the spatial movements of an input motion may be represented as a distance-time function. Given the motion path curve of the input motion is defined as an arc length, and it is specified as a function of time to parameterize the curve within a range of a parameter value, t, where t∈ [0, 1], it is possible to estimate, by using t, a distance that corresponds to the time spent along the motion path of each of the input motion and the timing source (i.e., example motion selected by the user). Thus, it is possible to set time-distance correspondence between two different motions that have the same velocity but different timings.

Then, in order to smoothly transfer the change of a global velocity of the input motion into the global velocity of the timing source, the apparatus matches the input motion and the example motion at the ratio of velocities that is based on generic time t of the two motions, as depicted in S924.

Then, the apparatus applies the joint rotation timings in the timing source to the joints in the input motion, as depicted in S923. In order to smoothly transfer the motion style in the timing source to the input motion, it is important not only to match the global velocity between two motions, but also to transfer the succession of joints in the upper body part, starting from the root joint to the joints of the head and leading parts of both hands, in correspondence with the motion style. Here, because movements by the joints in the lower body part below the root of the skeleton contain key physical information (a location of a foot from the ground) and features, the timing transfer is not applied to the lower-body joints. Given that a joint rotation shift is β and an amplitude scale is α, in the skeleton model consisting of multiple joints as shown in FIG. 1, the peak rotations of child and parent joints in the input motion are aligned to ones in the timing source, and then the rotation location and the scale may be adjusted according to the range of movement in the upper body.

Then, the apparatus scales joint rotations in accordance with the transferred timings for the joints so as to generate a final output motion, as depicted in S925.

According to the present invention, the user may efficiently generate a motion of a new style while preserving a quality of the original motion by applying the style in the selected example motion to an input motion (timing information) without editing the spatial details of the original motion.

Also, it is possible to transform an input motion into a desired style by reusing data generated by skilled animators, as well as the user is not required to have specialized knowledge needed in the process of editing an input motion, such as the analysis of physical features and understanding of qualitative aspects of the motion.

In addition, in order to generate an output motion, only the spatial movement in the input motion is edited based only on the timing information of the example motion, so that noise and errors caused by editing spatial movements in the original motion do not occur, and it is thus possible to generate motion data of a high quality.

Also, in the motion analysis and transfer, the motion style transfer is automatically performed with minimal user intervention, so that it is possible to quickly generate a large number of motion data necessary for generating large-scale animation. Accordingly, it is possible to scale up the example motion DB 10 at a low cost by reusing the existing motions that have been previously generated, and the exemplary embodiments of the present disclosure may be practical in various interactive applications, such as games, virtual reality, broadcasting, avatars, and the like, where 3D character's motions are utilized.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating 3-dimensional (3D) character motion via timing transfer, the apparatus comprising:
   an example motion database that stores data about two or more example motions of characters which have an identical skeleton model structure;
   an example motion analyzer that receives the example motion data from the example motion database, detects key times of the example motion data, and generates a timing source having a motion style by setting correspondence in timing between the example motions based on the detected key times; and
   an input motion transfer part that receives the timing source from the example motion analyzer and re-adjusts spatial movements in an input motion in correspondence with the generated timing source so as to apply the motion style of the timing source to the input motion to generate an output motion having a desired style,
   wherein the input motion transfer part comprises:
   a global velocity controller configured to receive the timing source from the example motion analyzer and controls global velocity of motions in the input motion in correspondence with the timing source; and
   a joint rotation controller configured to receive the timing source from the global velocity controller and applies joint rotation timings in the timing source to the joints in the input motion, and
   wherein the joint rotation controller comprises:
   a timing controller configured to receive the timing source from the global velocity controller, transfer timings for the joints by aligning peak rotations of child and parent joints in the input motion to peak rotations of child and parent joints in the timing source, and adjusts a rotation location and a scale according to a range of movement in an upper body of the skeleton model structure; and
   a scaling part that receives the transferred timings for the joints from the timing controller and scales joint rotations in accordance with the transferred timings for the joints.

2. The apparatus of claim 1, wherein the example motion analyzer comprises:
   a timing source detector that receives the example motion data from the example motion database, automatically detects the key times in the example motion data, and generates the timing source; and
   a timing alignment part that receives the timing source from the timing source detector, normalizes the detected key times into generic times, and compares frames of the example motions that correspond to the normalized key times so as to set the correspondence in timing between the example motions.

3. The apparatus of claim 2, wherein the timing source detector comprises:
   a joint noise reducer that receives the data from the example motion database, filters out positional noise from joints that include joints at both hands, both feet and head of each of the characters to output filtered data; and
   a key time detector that receives the filtered data from the joint noise reducer, detects the key times from the filtered data based on a contact between a foot of the skeleton model structure and a ground of a virtual space in each frame of the example motions, and detects the key times according to acceleration values of the both hands and the head of each of the characters.

4. The apparatus of claim 3, wherein the joint noise reducer smooths out local peaks of noise from motion curves of the joints by using a low-pass filter.

5. The apparatus of claim 3, wherein the key time detector calculates every position of a joint at a leading part of the foot in all frames included in the example motion, detects specific frames that contain postures in which a height of the joint at the leading part of the foot from the ground is less than a designated percent of a total length of the foot, with reference to an up-axis of the virtual space, then, selects, from among the detected frames, those in which a movement of the joint at the leading part of the foot has an acceleration that is near zero, and designates, as a key time of the foot, a timing of a frame at which the position of the joint at the leading part of the foot is closest to an average position of the foot.

6. The apparatus of claim 3, wherein the key time detector designates a timing of a frame in which an acceleration of each of the both hands and the head of each of the characters is near zero as the key time of a respective of the both hands and the head in each frame of the example motion.

7. The apparatus of claim 1, wherein the global velocity controller comprises:
- an arc length calculator that receives the timing source from the example motion analyzer, re-defines spatial movements of the input motion as parameters of a motion path curve, and calculates an instantaneous velocity of the input motion according to time from a function of the motion path curve; and
- a velocity ratio redistributor that receives the timing source from the arc length calculator and matches the input motion and the example motion at a ratio of velocities that is based on times of the input motion and the example motion in order to smoothly transfer a change of a global velocity of the input motion into a global velocity of the timing source.

8. A method for generating a 3D character motion via timing transfer, the method comprising:
- detecting key times of two or more example motions of characters which have an identical skeleton model structure;
- generating a timing source having a motion style by setting correspondence in timing between the example motions based on the detected key times; and
- transforming an input motion to an output motion having a desired style by re-adjusting spatial movements in the input motion in correspondence with the generated timing source so as to apply the motion style of the timing source to the input motion to generate the output motion,
- wherein the transforming of the input motion comprises controlling global velocity of motions, in the input motion in correspondence with the timing source and applying joint rotation timings in the timing source to the joints in the input motion, and
- wherein the controlling of the global velocity of motions comprises re-defining spatial movements of the input motion as parameters of a motion path curve, calculating an instantaneous velocity of the input motion according to time from a function of the motion path curve, and matching the input motion and the example motion at a ratio of velocities that is based on times of the input motion and the example motion in order to smoothly transfer a change of a global velocity of the input motion into a global velocity of the timing source.

9. The method of claim 8, wherein the generating of the timing source comprises automatically detecting key times in the example motions, generating the timing source, normalizing the detected key times into generic times, and comparing frames of two or more example motions that correspond to the normalized key times so as to set correspondence in timing between the two or more example motions.

10. The method of claim 9, wherein the generating of the timing source comprises filtering out positional noise from joints that include joints at both hands, both feet and the head of each of the characters to output filtered data, detecting the key times from the filtered data based on a contact between the foot of the skeleton model structure and a ground of a virtual space in each frame of the example motions, and detecting the key times according to acceleration values of the both hands and the head of each of the characters.

11. The method of claim 10, wherein the filtering comprises smoothing out local peaks of noise from motion curves of the joints by using a low-pass filter.

12. The method of claim 10, wherein the detection of the key time of the foot comprises calculating every position of a joint at a leading part of the foot in all frames included in the example motion, detecting specific frames that contain postures in which a height of the joint at the leading part of the foot from the ground is less than a designated percent of a total length of the foot, with reference to an up-axis of the virtual space, then, selecting, from among the detected frames, those in which a movement of the joint at the leading part of the foot has an acceleration that is near zero, and designating, as a key time of the foot, a timing of a frame at which the position of the joint at the leading part of the foot is closest to an average position of the foot.

13. The method of claim 10, wherein the detection of the key times of the hands and head comprises designating a timing of a frame in which an acceleration of each of the both hands and the head of each of the characters is near zero as the key time of a respective of the both hands and the head in each frame of the example motion.

14. A method for generating a 3D character motion via timing transfer, the method comprising:
- detecting key times of two or more example motions of characters which have an identical skeleton model structure;
- generating a timing source having a motion style by setting correspondence in timing between the example motions based on the detected key times; and
- transforming an input motion to an output motion having a desired style by re-adjusting spatial movements in the input motion in correspondence with the generated timing source so as to apply the motion style of the timing source to the input motion to generate the output motion,
- wherein the transforming of the input motion comprises controlling global velocity of motions, in the input motion in correspondence with the timing source and applying joint rotation timings in the timing source to the joints in the input motion, and
- wherein the applying of the joint rotation timings comprises, after transferring timings for the joints by aligning peak rotations of child and parent joints in the input motion to peak rotations of child and parent joints in the timing source and adjusting a rotation location and a scale according to a range of movement in an upper body of the skeleton model structure, scaling joint rotations in accordance with the transferred timings for the joints.

* * * * *